US008006051B2

(12) United States Patent
Takehana et al.

(10) Patent No.: US 8,006,051 B2
(45) Date of Patent: Aug. 23, 2011

(54) DATA PROCESSING DEVICE HAVING A MAINTENANCE COUNTER FUNCTION

(75) Inventors: Takashi Takehana, Ueda (JP);
Hisakazu Koyama, Nagano (JP);
Tamakazu Kitamura, Hagano (JP)

(73) Assignee: Seiko Epson Corporation, Tokyo (JP)

( * ) Notice: Subject to any disclaimer, the term of this patent is extended or adjusted under 35 U.S.C. 154(b) by 221 days.

(21) Appl. No.: 11/445,349

(22) Filed: May 31, 2006

(65) Prior Publication Data

US 2007/0028061 A1 Feb. 1, 2007

(30) Foreign Application Priority Data

Jul. 12, 2005 (JP) .................................. 2005-203687

(51) Int. Cl.
*G06F 12/16* (2006.01)
(52) U.S. Cl. ........ 711/162; 711/103; 711/161; 711/165; 714/6
(58) Field of Classification Search .................. 711/165, 711/103, 161, 162; 714/6
See application file for complete search history.

(56) References Cited

U.S. PATENT DOCUMENTS

| 5,452,059 | A  |   | 9/1995  | Sekiya |
| 6,832,330 | B1 | * | 12/2004 | Boudrie et al. ................... 714/6 |
| 2001/0024386 | A1 | * | 9/2001  | Harari et al. ................... 365/200 |
| 2003/0191916 | A1 | * | 10/2003 | McBrearty et al. ........... 711/162 |
| 2004/0030825 | A1 | * | 2/2004  | Otake et al. ................... 711/105 |
| 2007/0058451 | A1 | * | 3/2007  | Uchida ..................... 365/189.05 |

FOREIGN PATENT DOCUMENTS

| JP | 6-75442     | 3/1994  |
| JP | 06-155867   | 6/1994  |
| JP | 06-312559   | 11/1994 |
| JP | 09-058014   | 3/1997  |
| JP | 09-258618   | 10/1997 |
| JP | 2003-191583 | 7/2003  |

\* cited by examiner

*Primary Examiner* — Jae U Yu
(74) *Attorney, Agent, or Firm* — Nutter McClennen & Fish LLP; John J. Penny, Jr.

(57) ABSTRACT

A data processing device with maintenance counters reliably stores the maintenance counter values. A data processing device such as a printer has RAM for storing the maintenance counter values, EEPROM segmented into a nonvolatile maintenance counter area and a temporary maintenance counter storage area, and a CPU for updating the maintenance counter values in RAM based on detection of a state change in the printer. The CPU writes the maintenance counter values accumulated in RAM at a predetermined time to the temporary maintenance counter storage area, and at a predetermined time writes the maintenance counter values from the temporary maintenance counter storage area to the nonvolatile maintenance counter area.

2 Claims, 7 Drawing Sheets

| No. | Maintenance counter name (internal counter number) | Count (4 bytes) |
|---|---|---|
| 1 | Power on time | XXXX |
| 2 | Slip front printing mechanism, paper feed steps | XXXX |
| 3 | Slip front printing mechanism, head energizing strokes | XXXX |
| 4 | Roll paper printing mechanism, paper feed steps | XXXX |
| 5 | Roll paper printing mechanism, head energizing pulse count | XXXX |
| 6 | No. of paper cutter operations | XXXX |
| 7 | MICR read count | XXXX |
| 8 | Slip back printing mechanism, head energizing count | XXXX |
| 9 | Slip back printing mechanism, no. of characters printed | XXXX |
| 10 | Slip reading mechanism, read count | XXXX |
| 11 | Slip reading mechanism, paper feed steps | XXXX |
| 12 | Card reading mechanism, read count | XXXX |
| 13 | Card reading mechanism, paper feed steps | XXXX |
| 14 | <reserved> | XXXX |
| 15 | <reserved> | XXXX |
| 16 | <reserved> | XXXX |
| 17 | Total cumulative: Power on time | XXXX |
| 18 | Total cumulative: Slip front printing mechanism, paper feed steps | XXXX |
| 19 | Total cumulative: Slip front printing mechanism, head energizing strokes | XXXX |
| 20 | Total cumulative: Roll paper printing mechanism, paper feed steps | XXXX |
| 21 | Total cumulative: Roll paper printing mechanism, head energizing pulse count | XXXX |
| 22 | Total cumulative: No. of paper cutter operations | XXXX |
| 23 | Total cumulative: MICR read count | XXXX |
| 24 | Total cumulative: Slip back printing mechanism, head energizing count | XXXX |
| 25 | Total cumulative: Slip back printing mechanism, no. of characters printed | XXXX |
| 26 | Total cumulative: Slip reading mechanism, read count | XXXX |
| 27 | Total cumulative: Slip reading mechanism, paper feed steps | XXXX |
| 28 | Total cumulative: Card reading mechanism, read count | XXXX |
| 29 | Total cumulative: Card reading mechanism, paper feed steps | XXXX |
| 30 | <reserved> | XXXX |
| 31 | <reserved> | XXXX |
| 32 | <reserved> | XXXX |

FIG. 4

| No. | Data validity information | | Count (4 bytes) |
| --- | --- | --- | --- |
| | A | B | |
| 1 | Maintenance counter number (1) | Maintenance counter number (1) | XXXX |
| 2 | Maintenance counter number (17) | Maintenance counter number (17) | XXXX |
| 3 | Maintenance counter number (3) | Maintenance counter number (3) | XXXX |
| 4 | Maintenance counter number (19) | Maintenance counter number (19) | XXXX |
| 5 | | | |
| 6 | | | |
| 7 | | | |
| 8 | | | |
| 9 | | | |
| 10 | | | |
| 11 | | | |
| 12 | | | |
| 13 | | | |
| 14 | | | |
| 15 | | | |
| 16 | | | |
| 17 | | | |
| 18 | | | |
| 19 | | | |
| 20 | | | |
| 21 | | | |

DATA PROCESSING DEVICE HAVING A MAINTENANCE COUNTER FUNCTION

This application claims priority from JP 2005-203687, filed on Jul. 12, 2005, which is incorporated by reference in its entirety.

BACKGROUND OF THE INVENTION

1. Field of Technology

The present invention relates to a data processing device such as a printer or scanner that has a maintenance counter function.

2. Description of Related Art

Data processing devices such as printers and scanners commonly have a maintenance counter for monitoring the use of parts that wear out over time as a result of normal use, such as the print head and paper transportation rollers, in order to determine the service life of those parts. When a thermal printing mechanism is used, the maintenance counter counts print head usage based on the length of paper advanced passed the print head or the number of drive pulses applied to the thermal head, for example. The usage count is then stored and accumulated in nonvolatile memory, and if the cumulative total usage count exceeds a predetermined level, the user is prompted to replace the print head or other worn parts by reporting an alarm, for example.

The printer taught in Japanese Unexamined Patent Appl. Pub. H06-155867, for example, has a first maintenance counter that is cleared by replacing a consumable product, and a second maintenance counter that is not cleared when the consumable being monitored is replaced and instead continues accumulating the total usage count. The first maintenance counter in this printer is used as a trigger for predicting the end of the service life of the monitored consumable and prompting the user to replace the consumable, and the second maintenance counter measures the cumulative total usage from the time the printer was shipped from the factory in order to manage total cumulative usage.

Products using this type of maintenance counter are built so that the data is not lost when power is not supplied.

The thermal printer taught in Japanese Unexamined Patent Appl. Pub. H06-312559, for example, has a power failure detection circuit that monitors the power supply voltage and outputs a power failure signal when a voltage drop in the power supply voltage is detected. When a power failure occurs and the power failure signal is output, the maintenance counter reading in RAM is written to nonvolatile EEPROM before printing stops and power is lost completely so that the maintenance counter can be stored and is not lost when the power turns off.

Because the maintenance counter is used to determine when the end of the service life of a particular component has been reached, the count of the maintenance counter must be retained even when the power supply is suddenly interrupted, such as when a power failure occurs, as described in Japanese Unexamined Patent Appl. Pub. H06-312559. However, in order to write the maintenance counter count stored in RAM to a nonvolatile EEPROM device after the power fails and before power is completely lost, voltage sufficient to enable the controller to function and write to EEPROM before the power turns off must be assured. Even if the controller is programmed to backup data from RAM to EEPROM, the control program will not function and the count will therefore be lost if sufficient voltage is not assured.

In practice, additional components must be provided in order to reliably write data to EEPROM if a power failure occurs or the power supply is interrupted while writing. This requires an arrangement, such as an auxiliary power supply or uninterruptable power supply, that can assure voltage sufficient to write from RAM to EEPROM after a power failure occurs. Improving reliability by such means necessarily increases the complexity of the circuit design, increases device size, and increases product cost.

In addition, writing to EEPROM can fail for other reasons. If writing to EEPROM fails and content is lost from the EEPROM device, maintenance counter information accumulated over a period of years may also be lost, and when the monitored parts must be replaced will therefore be unknown.

The present invention is directed to solving this problem, and an object of the invention is to provide a data processing device comprising a maintenance counter that can reliably store the maintenance count information under any conditions.

SUMMARY OF THE INVENTION

To achieve this object, a data processing device according to an embodiment of the invention comprises: volatile memory for storing a maintenance counter value; EEPROM comprising a nonvolatile maintenance counter area and a temporary maintenance counter storage area; and a CPU for updating the maintenance counter value in the volatile memory based on detection of a state change in the data processing device; wherein the CPU writes the maintenance counter value from volatile memory to the temporary maintenance counter storage area at a predetermined timing, and writes the maintenance counter value stored in the temporary maintenance counter storage area to the nonvolatile maintenance counter area at a predetermined timing.

In a data processing device according to another embodiment of the invention, the volatile memory has a first volatile maintenance counter area for storing the maintenance counter value, and a second volatile maintenance counter area for storing the maintenance counter value; the maintenance counter value stored to the second volatile maintenance counter area when data processing device power turns on is identical to the maintenance counter value stored in the first volatile maintenance counter area; the maintenance counter value in the first volatile maintenance counter area is updated based on detection of a state change in the data processing device; and the CPU compares the content of the first volatile maintenance counter area and the content of the second volatile maintenance counter area at a predetermined timing, and writes the updated maintenance counter value to the temporary maintenance counter storage area.

In a data processing device according to another embodiment of the invention, the CPU compares the content of the first volatile maintenance counter area and the content of the second volatile maintenance counter area at a predetermined timing, writes the updated maintenance counter value to the temporary maintenance counter storage area, and then copies the maintenance counter value from the first volatile maintenance counter area to the second volatile maintenance counter area.

In a data processing device according to another embodiment of the invention, when the CPU writes the maintenance counter value to the temporary maintenance counter storage area, the CPU also writes data validity information assuring that the maintenance counter value was written correctly.

In a data processing device according to another embodiment of the invention, a maintenance counter number denoting the maintenance counter associated with the maintenance counter value is written twice in the data validity information.

In a data processing device according to another embodiment of the invention, the CPU writes the maintenance counter value stored in the temporary maintenance counter storage area to the nonvolatile maintenance counter area when the temporary maintenance counter storage area becomes full.

In a data processing device according to another embodiment of the invention, the CPU writes the maintenance counter value stored in the temporary maintenance counter storage area to the nonvolatile maintenance counter area, and then reinitializes the temporary maintenance counter storage area.

Another embodiment of the invention is a control method for a data processing device comprising volatile memory for storing a maintenance counter value, EEPROM comprising a nonvolatile maintenance counter area and a temporary maintenance counter storage area, and a CPU for updating the maintenance counter value in the volatile memory based on detection of a state change in the data processing device. This control method comprises the steps of: writing the maintenance counter value from volatile memory to the temporary maintenance counter storage area at a predetermined timing; and writing the maintenance counter value stored in the temporary maintenance counter storage area to the nonvolatile maintenance counter area at a predetermined timing.

In a data processing device control method according to another embodiment of the invention, the volatile memory has a first volatile maintenance counter area for storing the maintenance counter value, and a second volatile maintenance counter area for storing the maintenance counter value; the maintenance counter value stored to the second volatile maintenance counter area when data processing device power turns on is identical to the maintenance counter value stored in the first volatile maintenance counter area; the maintenance counter value in the first volatile maintenance counter area is updated based on detection of a state change in the data processing device; and the content of the first volatile maintenance counter area and the content of the second volatile maintenance counter area are compared at a predetermined timing, and the updated maintenance counter value is written to the temporary maintenance counter storage area.

In a data processing device control method according to another embodiment of the invention, the content of the first volatile maintenance counter area and the content of the second volatile maintenance counter area are compared, the updated maintenance counter value is written to the temporary maintenance counter storage area, and the maintenance counter value from the first volatile maintenance counter area is then copied to the second volatile maintenance counter area.

In a data processing device control method according to another embodiment of the invention, data validity information assuring that the maintenance counter value was written correctly is also written after the maintenance counter value is written to the temporary maintenance counter storage area.

In a data processing device control method according to another embodiment of the invention, a maintenance counter number denoting the maintenance counter associated with the maintenance counter value is written twice in the data validity information.

In a data processing device control method according to another embodiment of the invention, the maintenance counter value stored in the temporary maintenance counter storage area is written to the nonvolatile maintenance counter area when the temporary maintenance counter storage area becomes full.

In a data processing device control method according to another embodiment of the invention, the maintenance counter value stored in the temporary maintenance counter storage area is written to the nonvolatile maintenance counter area, and the temporary maintenance counter storage area is then reinitialized.

A data processing device according to a preferred embodiment of the invention thus has volatile memory for storing a maintenance counter value, EEPROM comprising a nonvolatile maintenance counter area and a temporary maintenance counter storage area, and a CPU for updating the maintenance counter value in the volatile memory based on detection of a state change in the data processing device. The CPU writes the maintenance counter value from volatile memory to the temporary maintenance counter storage area at a predetermined timing, and writes the maintenance counter value stored in the temporary maintenance counter storage area to the nonvolatile maintenance counter area at a predetermined timing.

By thus rendering both a nonvolatile maintenance counter area and a temporary maintenance counter storage area in EEPROM, the maintenance counter stored in at least one of the EEPROM areas will always contain valid information insofar as the maintenance counter values are correctly copied from the volatile memory to the temporary maintenance counter storage area in EEPROM. Data will therefore not be lost even if writing to one of the storage areas in EEPROM fails because the data in the other EEPROM storage area will be correct. Problems such as not knowing when it is time to replace certain parts as a result of losing maintenance counter information accumulated over a number of years are thus prevented, and highly reliable maintenance counters can thus be maintained.

Further preferably, the volatile memory has a first volatile maintenance counter area for storing the maintenance counter value, and a second volatile maintenance counter area for storing the maintenance counter value. The maintenance counter value in the first volatile maintenance counter area is updated based on detection of a state change in the data processing device. The content of the first volatile maintenance counter area and the content of the second volatile maintenance counter area are compared at a predetermined timing, and updated maintenance counter values are written to the temporary maintenance counter storage area.

This reduces the number of write operations to EEPROM, and because the data writing speed of EEPROM devices is slow, this arrangement also reduces the processing load imposed by the maintenance counters.

Yet further preferably, the content of the first volatile maintenance counter area and the content of the second volatile maintenance counter area are compared, the updated maintenance counter values are written to the temporary maintenance counter storage area, and the updated maintenance counter values are then copied from the first volatile maintenance counter area to the second volatile maintenance counter area.

The maintenance counter values in the second volatile maintenance counter area can thus be updated to the most recent values whenever the predetermined time passes, and whether the information in the first volatile maintenance counter area has been updated can be reliably determined at each predetermined time interval.

Yet further preferably, when the maintenance counter value is written to the temporary maintenance counter storage area, data validity information assuring that the maintenance counter value was written correctly is also written.

As a result, whether the data written in the temporary maintenance counter storage area in EEPROM is valid or not can be readily determined. Problems caused by a loss of maintenance counter data from the nonvolatile maintenance counter area can therefore also be prevented by blocking writing invalid data to the nonvolatile maintenance counter.

Yet further preferably, the data validity information is a maintenance counter number denoting the maintenance counter associated with the maintenance counter value written twice.

If at least one of the maintenance counter numbers is written after the maintenance counter value is updated and both maintenance counter numbers match for a given maintenance counter value, the data processing device is known to have been operating correctly at least until that maintenance counter value was written. Reliability is thus improved.

Further preferably, the maintenance counter value stored in the temporary maintenance counter storage area is written to the nonvolatile maintenance counter area when the temporary maintenance counter storage area becomes full.

This arrangement reduces the number of write operations to EEPROM, and because the data writing speed of EEPROM devices is slow, this arrangement also reduces the processing load imposed by the maintenance counters.

Yet further preferably, the temporary maintenance counter storage area is reinitialized after the maintenance counter value stored in the temporary maintenance counter storage area is written to the nonvolatile maintenance counter area.

This aspect of the invention initializes the temporary maintenance counter storage area only after first verifying that the nonvolatile maintenance counter area was updated. The maintenance counters can thus be reliably correctly maintained in at least one of the two storage areas in EEPROM, and maintenance counter reliability can therefore be improved.

Other objects and attainments together with a fuller understanding of the invention will become apparent and appreciated by referring to the following description and claims taken in conjunction with the accompanying drawings.

BRIEF DESCRIPTION OF THE DRAWINGS

FIG. 4 shows the types and states of maintenance counters stored in the nonvolatile maintenance counter area.

DESCRIPTION OF THE PREFERRED EMBODIMENTS

Preferred embodiments of a data processing device and a control method for a data processing device according to the present invention are described below with reference to the accompanying figures using a printer by way of example.

* Printer Configuration

Figure 1:
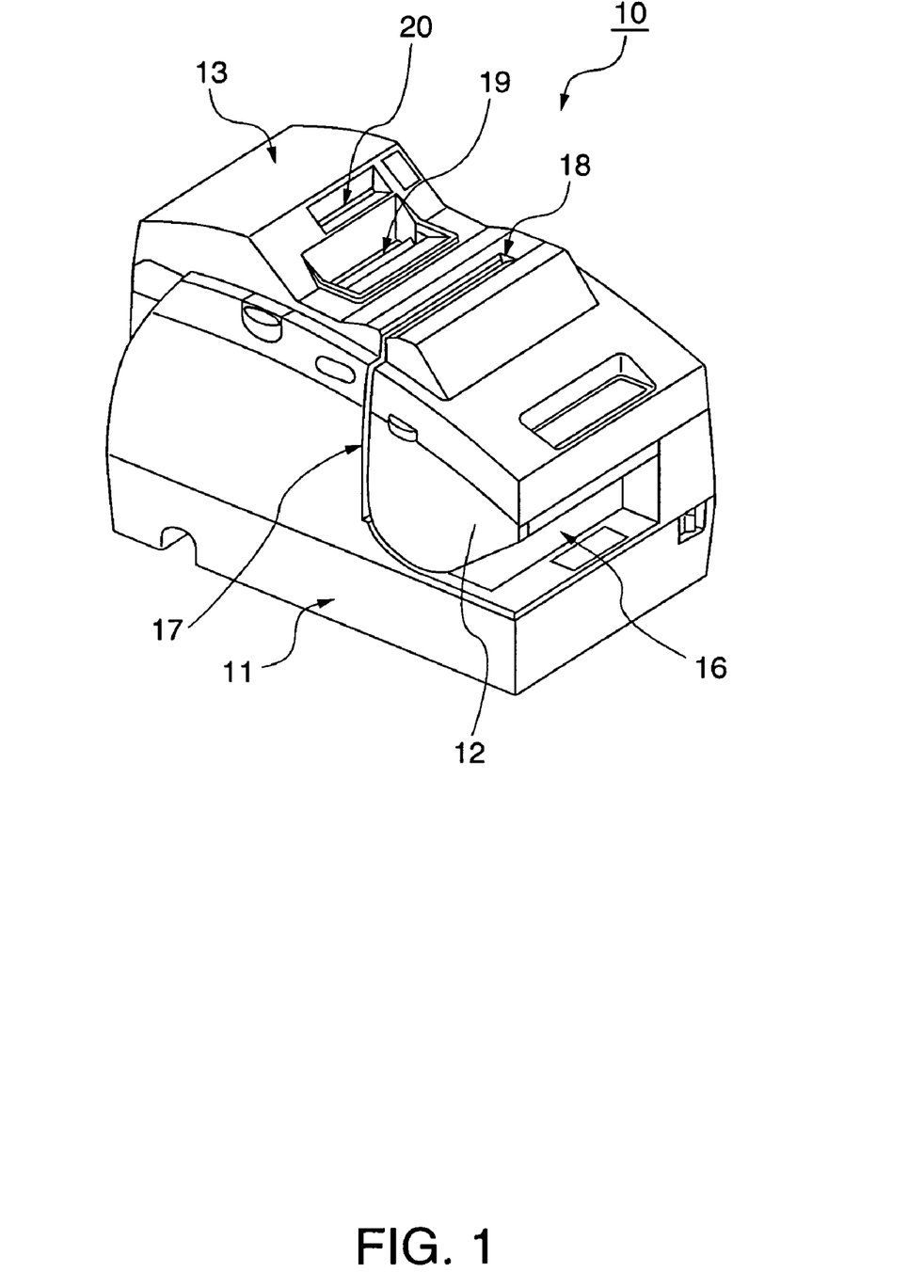
FIG. 1 is an oblique view of a printer according to a preferred embodiment of the invention.

FIG. 1 is an oblique view of a printer according to a preferred embodiment of the invention.

A printer 10 according to this embodiment of the invention is a hybrid printer that can print to both the front and back sides of a check or other slip, and can print to roll paper for issuing sales receipts, for example. The printer 10 has a main unit 11, a front cover unit 12, and a back cover unit 13. The front cover unit 12 is disposed to the front of the main unit 11 so that the front cover unit 12 can open and close.

Roll paper not shown is loaded inside the main unit 11 of the printer 10. The roll paper is conveyed through a roll paper transportation path (not shown in the figure) located inside the main unit 11 and printed. The printed roll paper is then discharged from a roll paper exit 19 opened in the top of the front cover unit 12.

A slip insertion opening 16 for inserting slips is located at the front of the printer 10. A slip inserted from the slip insertion opening 16 is conveyed through a slip transportation path 17 disposed inside the main unit 11, and is discharged from a slip exit 18 located between the front cover unit 12 and back cover unit 13. The printer 10 in this embodiment of the invention prints to the slip, scans the slip, and reads MICR text from the slip (particularly from checks) as the slip is conveyed through the slip transportation path 17.

An image scanner for imaging credit cards, identification (ID) cards, and similar types of card media is disposed inside the back cover unit 13. Cards are inserted from a card insertion slot 20 rendered at the front of the back cover unit 13, imaged by the image scanner, and then discharged from the same card insertion slot 20.

Figure 2:
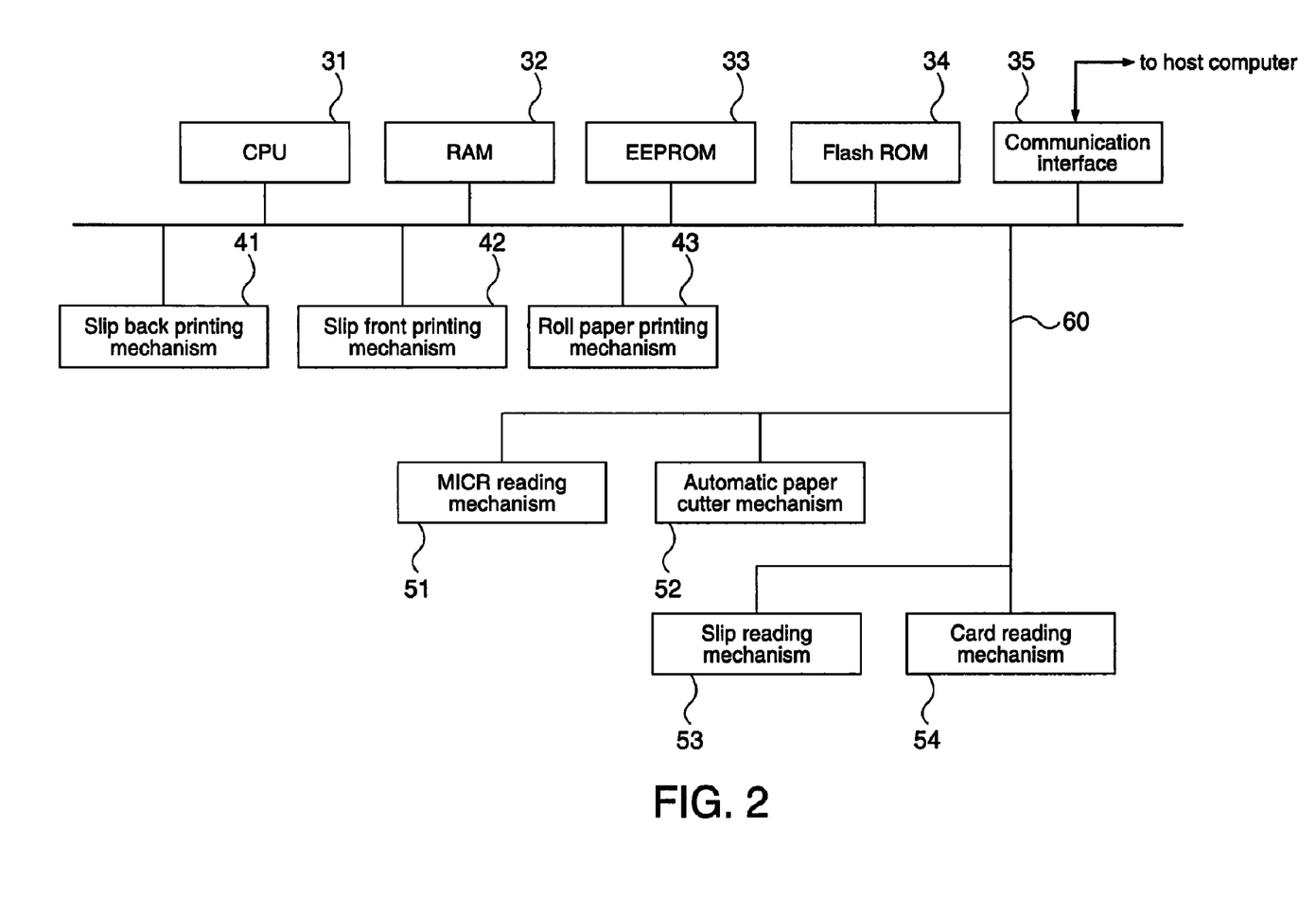
FIG. 2 is a block diagram showing the control arrangement of the printer in a preferred embodiment of the invention.

FIG. 2 is a block diagram showing the control arrangement of the printer in this embodiment of the invention.

The printer 10 is connected to and communicates with an external host to host computer, and operates, prints, and scans media in response to commands sent from the host computer.

The printer 10 comprises primarily a CPU 31, RAM 32, EEPROM 33, flash ROM 34, communication interface 35, slip back printing mechanism 41, slip front printing mechanism 42, roll paper printing mechanism 43, MICR reading mechanism 51, automatic paper cutter mechanism 52, slip reading mechanism 53, and card reading mechanism 54, all of which are electrically connected to a system bus 60. The parts of the printer 10 are schematically shown connected to a system bus 60 in FIG. 2, but it will be obvious that any arrangement enabling the parts to function can be used.

The CPU 31 is the central control unit of the printer 10, and controls the operation of the printing mechanisms 41 to 43, the reading mechanisms 51, 53, and 54, and the automatic paper cutter mechanism 52 by running firmware stored in flash ROM 34.

RAM 32 is the volatile working memory of the printer 10. While RAM 32 is shown schematically in FIG. 2 as a single device, RAM 32 could obviously comprise a plurality of chips as needed. RAM 32 includes a receive buffer for temporarily storing data received from the host computer, a print buffer for temporarily storing print data, and an image buffer for storing image data. A counter storage area that is part of the volatile maintenance counter is also rendered in RAM 32 as described in further detail below.

EEPROM 33 is nonvolatile memory that writes data in 1 byte units, and internally stores a nonvolatile maintenance counter for holding the maintenance counts even when power is not supplied. This is further described below.

Flash ROM 34 is nonvolatile memory that enables electrically writing data in predetermined sector units, and internally stores the printer control firmware.

The communication interface 35 is the interface for communicating with an external host computer. Data received from the host computer and data to be sent to the host computer is received and sent through the communication interface 35.

The slip back printing mechanism 41 is disposed beside the slip transportation path 17 for printing to the back side of a slip travelling through the slip transportation path 17. The slip back printing mechanism 41 in this embodiment of the invention is a shuttle impact dot matrix print head that prints by driving the print head based on commands from the CPU 31.

The slip front printing mechanism 42 is disposed beside the slip transportation path 17 for printing to the front side of a slip travelling through the slip transportation path 17. The slip front printing mechanism 42 in this embodiment of the invention is a serial impact dot matrix print head that prints by driving the print head based on commands from the CPU 31.

The roll paper printing mechanism 43 is disposed to the roll paper transportation path for printing to roll paper conveyed through the transportation path. The roll paper printing mechanism 43 uses a thermal print head, and prints by driving the print head based on commands from the CPU 31.

The MICR reading mechanism 51 is a magnetic sensor that is disposed near the slip insertion opening 16 to the slip transportation path 17 for reading magnetic ink characters (MICR text) printed on a slip, such as a check, conveyed through the slip transportation path 17.

The automatic paper cutter mechanism 52 is disposed near the roll paper exit 19 along the roll paper transportation path, and operates according to a paper cutter drive signal output from the CPU 31 to cut the roll paper conveyed passed the cutter mechanism.

The slip reading mechanism 53 is an image sensor that is disposed to the slip transportation path 17 for scanning and imaging slips.

The card reading mechanism 54 is a card scanning sensor that is similarly disposed to the card transportation path for scanning and imaging a card inserted from the card insertion slot 20.

A printer 10 according to this embodiment of the invention is thus a multifunction printer that can print on both the front and back sides of slips, read MICR text from slips, scan and image slips, print to roll paper, and scan and image cards.

The maintenance counter in a printer 10 according to this embodiment of the invention is described next with reference to FIG. 3.

Figure 3:
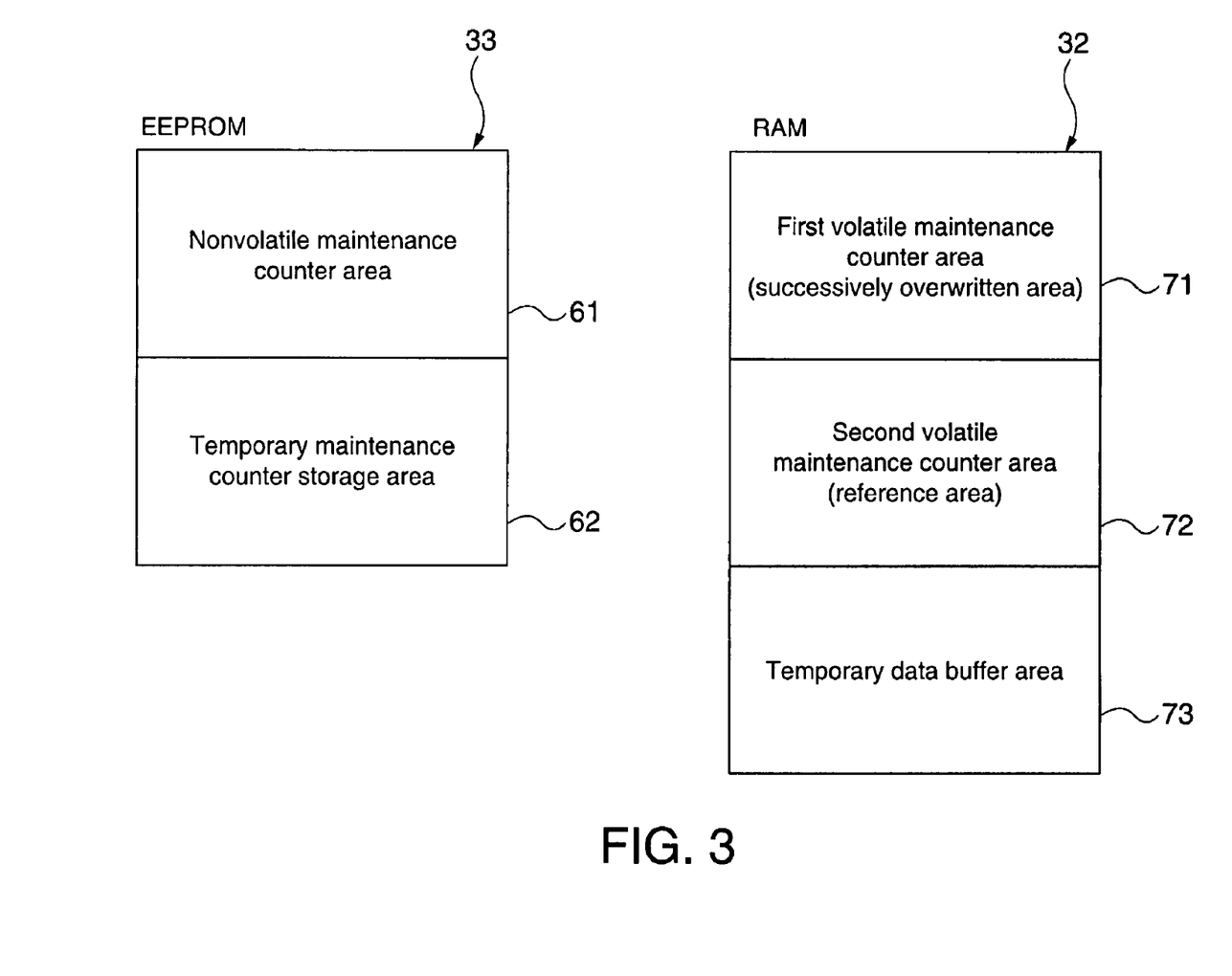
FIG. 3 schematically shows the internal structure of the EEPROM and RAM.

FIG. 3 schematically shows the internal structure of the EEPROM and RAM.

The printer 10 in this embodiment of the invention includes the maintenance counter using EEPROM 33 and RAM 32.

EEPROM 33 is internally segmented into a nonvolatile maintenance counter area 61 and a temporary maintenance counter storage area 62.

RAM 32 is internally segmented into first volatile maintenance counter area 71, second volatile maintenance counter area 72, and temporary data buffer area 73.

The nonvolatile maintenance counter area 61 disposed in EEPROM 33 is described first.

FIG. 4 shows the types and states of maintenance counters stored in the nonvolatile maintenance counter area 61.

The nonvolatile maintenance counter area 61 is the main maintenance counter storage area, and holds the counters even when power is not supplied. The nonvolatile maintenance counter area 61 stores maintenance counters for items 1 to 13 and 17 to 29 in FIG. 4. These maintenance counters indicate how much the printer 10 itself has been used, as well as how much the slip back printing mechanism 41, slip front printing mechanism 42, roll paper printing mechanism 43, MICR reading mechanism 51, automatic paper cutter mechanism 52, slip reading mechanism 53, and card reading mechanism 54 have been used. Each counter is 4 bytes long, and the name of each maintenance counter is referred to inside the printer by an internal counter number that is not shown in the figures.

All maintenance counters in the nonvolatile maintenance counter area 61 are initialized to zero the first time power is supplied so that none of the counters is undefined.

The first volatile maintenance counter area 71 and second volatile maintenance counter area 72 in RAM 32 are described next.

The first volatile maintenance counter area 71 and second volatile maintenance counter area 72 both have the same data structure as the nonvolatile maintenance counter area 61. The first volatile maintenance counter area 71 and second volatile maintenance counter area 72 are created by copying the data from the nonvolatile maintenance counter area 61 when the printer is turned on.

The counts stored in the first volatile maintenance counter area 71 are constantly updated and overwritten by the CPU 31 as the printer 10 is used and driving the various functional units of the printer 10 is detected. The first volatile maintenance counter area 71 is thus a sequentially overwritten area to which the most recent maintenance counter values are written in real-time based on the operating status of the printer 10.

The second volatile maintenance counter area 72 stores the same data as the first volatile maintenance counter area 71 until the first volatile maintenance counter area 71 is updated. The CPU 31 compares the readings in the second volatile maintenance counter area 72 with the first volatile maintenance counter area 71 at a predetermined timing to determine which of the maintenance counters has been updated.

The CPU 31 preferably compares the first and second maintenance counter areas at a short interval that will not overburden the CPU 31 and result in a drop in printer 10 performance. Considering the frequency at which the maintenance counters are updated, the interval between maintenance counter comparisons is typically approximately once every five minutes.

The first volatile maintenance counter area 71 is used for updating the maintenance counters in real time because writing EEPROM 33 takes more time than writing to RAM 32. Considering the processing load, it is therefore more efficient to accumulate the updated maintenance counters in RAM 32 for a predetermined period of time, and then batch copy the maintenance counter readings from RAM 32 to EEPROM 33 at one time.

The temporary maintenance counter storage area 62 rendered in EEPROM 33 is described next.

Figure 5:
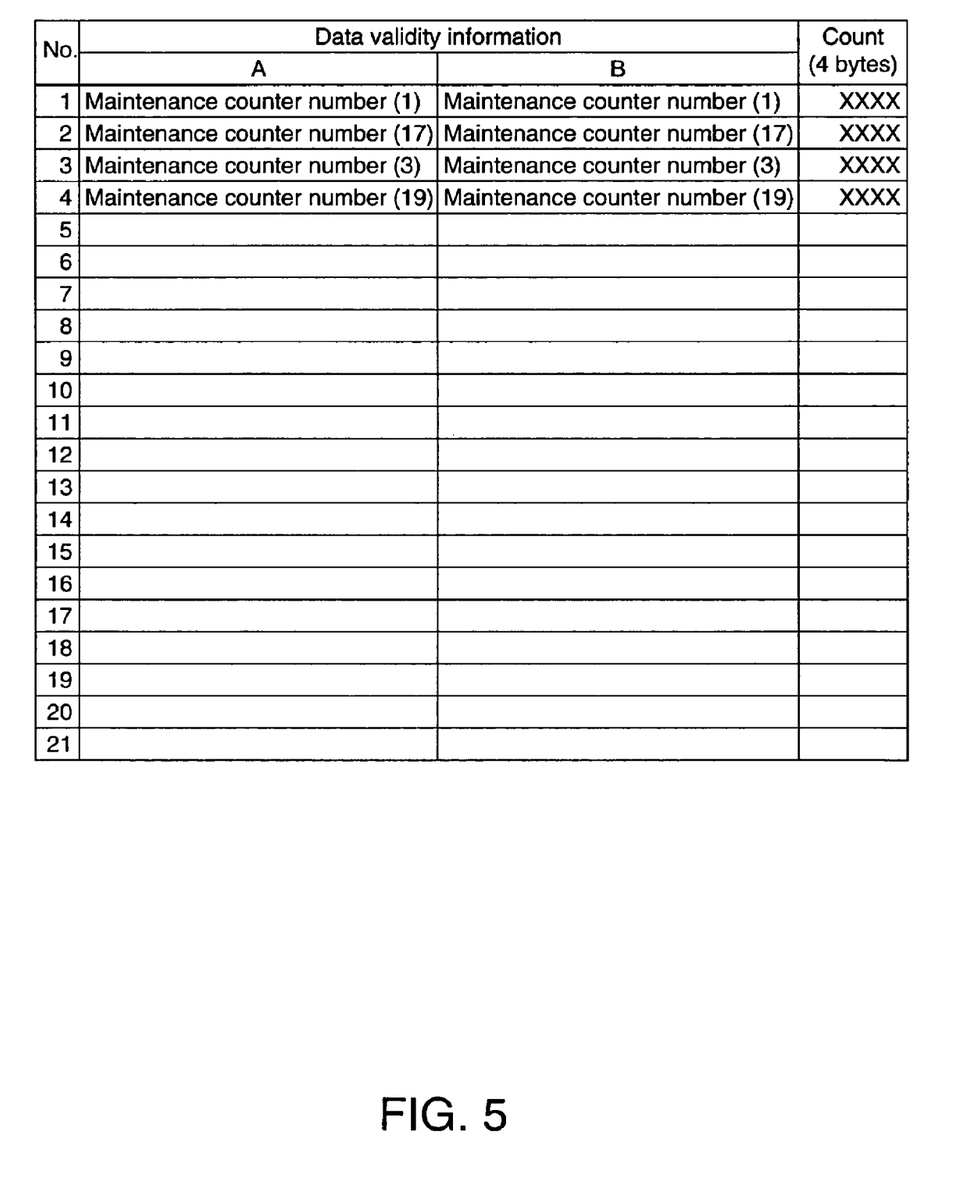
FIG. 5 shows a table of data stored in the temporary maintenance counter storage area.

FIG. 5 is a table showing data stored in the temporary maintenance counter storage area 62.

The temporary maintenance counter storage area 62 temporarily stores the update data to be written to nonvolatile maintenance counter area 61. When the CPU 31 compares the maintenance counter values in first volatile maintenance counter area 71 with the maintenance counter values in the second volatile maintenance counter area 72 at the predetermined timing and determines that a maintenance counter has been updated, the CPU 31 writes the number of the updated maintenance counter and the updated count to temporary maintenance counter storage area 62.

The temporary maintenance counter storage area 62 can store a predetermined number of maintenance counter readings. In the example shown in FIG. 5, the temporary maintenance counter storage area 62 can store 21 maintenance counter records. Each updated maintenance counter record includes data validity information comprising values A and B each denoting a maintenance counter number identifying a particular maintenance counter, and the count (value) of the maintenance counter corresponding to that maintenance counter number.

The temporary maintenance counter storage area 62 in this embodiment of the invention is structured so that after the maintenance counter count is written, the 1-byte maintenance counter number is written twice (that is, values A and B). By updating the maintenance counter and then writing the maintenance counter number twice, this embodiment of the invention knows that the temporary maintenance counter storage area 62 has been correctly updated if values A and B are the same. If A and B are not the same value, the maintenance counter corresponding to that maintenance counter number is considered invalid the next time the maintenance counter is read.

Alternatively, the temporary maintenance counter storage area 62 can be written by first writing the maintenance counter number to field A, then writing the value of the maintenance counter, and then writing the maintenance counter number to field B.

After the maintenance counters have been updated enough that the temporary maintenance counter storage area 62 is full (so that all 21 records have been filled in the sample table shown in FIG. 5), the CPU 31 writes the data in the table in FIG. 5 to temporary data buffer area 73, then writes the data from temporary data buffer area 73 to nonvolatile maintenance counter area 61, and thereby updates the nonvolatile maintenance counter area 61. After the nonvolatile maintenance counter area 61 is updated, the temporary maintenance counter storage area 62 is reinitialized and all data is cleared.

It also will be obvious that the nonvolatile maintenance counter area 61 can be updated by writing the maintenance counter data stored in the temporary maintenance counter storage area 62 directly to the nonvolatile maintenance counter area 61 without first writing the data to the temporary data buffer area 73.

As described above, this embodiment of the invention first writes the updated maintenance counters from temporary maintenance counter storage area 62 to temporary data buffer area 73 instead of directly to the nonvolatile maintenance counter area 61. This is because the same maintenance counter number may have been written more than once to the temporary maintenance counter storage area 62, and in a worst-case scenario all 21 records in the table shown in FIG. 5 could contain data for the same maintenance counter. If the maintenance counters are updated directly from temporary maintenance counter storage area 62 to nonvolatile maintenance counter area 61 in this situation, the same maintenance counter will be written repeatedly to EEPROM 33. In addition to this being inefficient, the number of EEPROM write operations is preferably minimized considering the service life of the EEPROM 33.

Therefore, in order to reduce the number of times EEPROM 33 is written in this embodiment of the invention, data is written from the temporary maintenance counter storage area 62 to temporary data buffer area 73, and the last (most recent) value written for each maintenance counter stored in the temporary data buffer area 73 is then written to EEPROM 33. The temporary data buffer area 73 in RAM can be written more quickly than EEPROM 33, and this method can therefore also improve processing speed.

By thus arranging the maintenance counters, this embodiment of the invention prevents losing the maintenance counters regardless of when the power supply is interrupted, and can reliably store the correct maintenance counter readings.

Figure 6:
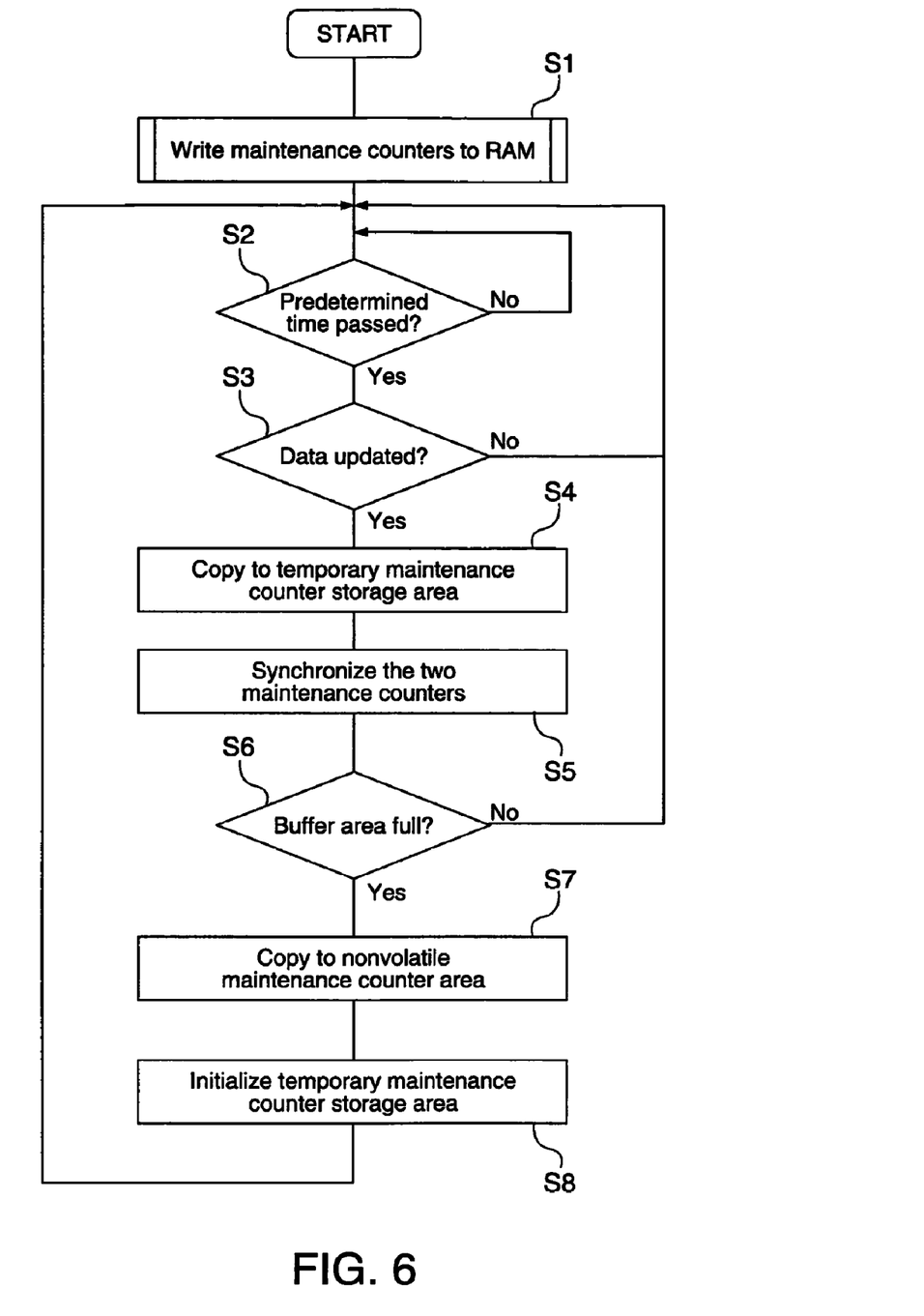
FIG. 6 is a flow chart describing the printer control processes relating to the maintenance counters.
Figure 7:
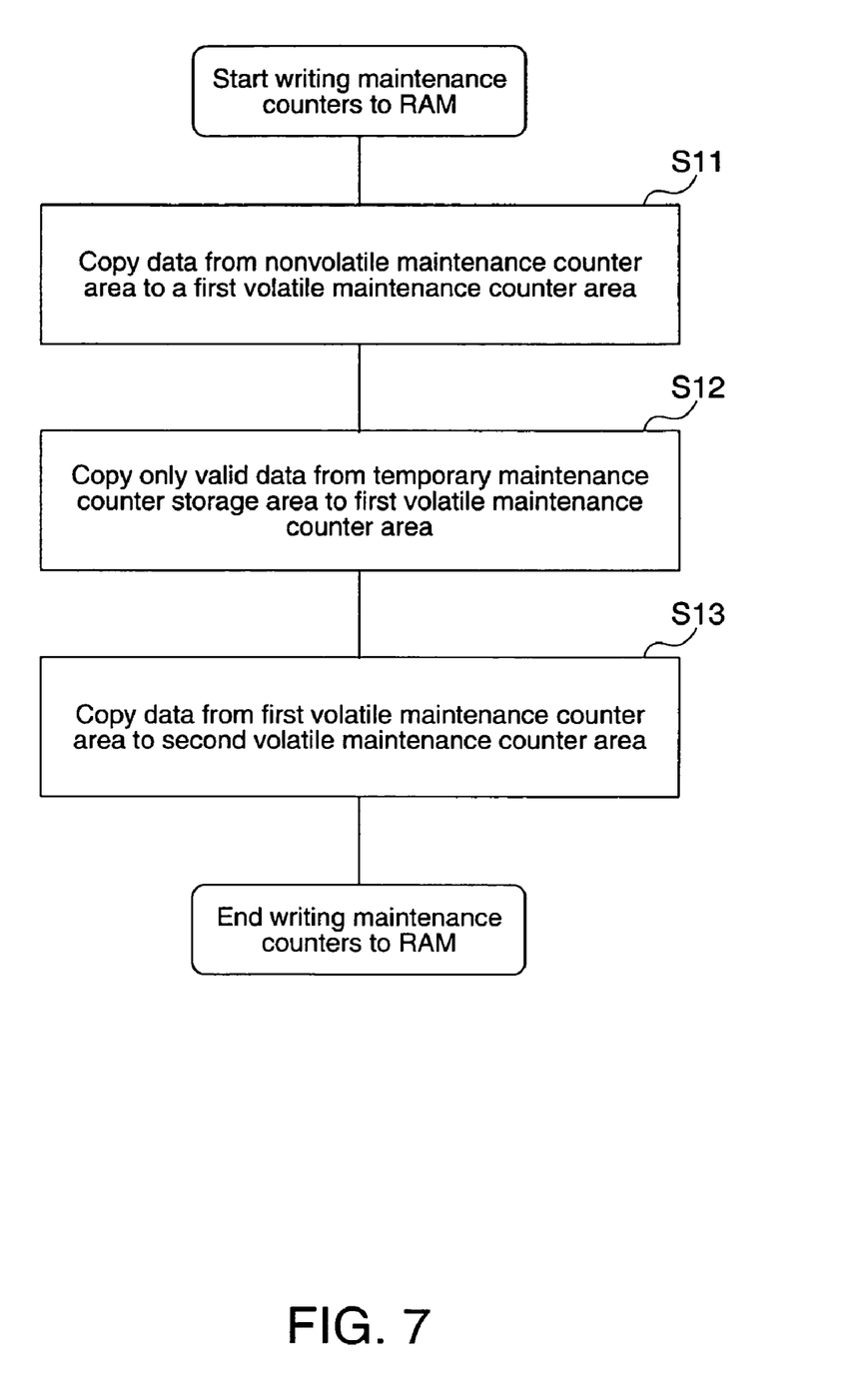
FIG. 7 is a flow chart describing the printer control processes relating to the maintenance counters.

This method of maintaining the maintenance counters is described more fully below with reference to the flow charts in FIG. 6 and FIG. 7 showing operation starting from when printer power turns on and printer operation starts until the nonvolatile maintenance counter area 61 is updated.

FIG. 6 and FIG. 7 are flow charts describing the printer 10 control processes relating to the maintenance counters.

When printer 10 power turns on, the printer initialization process executes, and the CPU 31 is enabled, the CPU 31 creates the first volatile maintenance counter area 71 and second volatile maintenance counter area 72 in RAM 32 (step S1).

To render the first volatile maintenance counter area 71 and second volatile maintenance counter area 72 in RAM 32, the CPU 31 first copies the data from nonvolatile maintenance counter area 61 to first volatile maintenance counter area 71 as shown in FIG. 7 (step S11).

If the data stored in nonvolatile maintenance counter area 61 is the most recent, the data written to the first volatile maintenance counter area 71 also will be the most recent. However, if data that has not yet been written to nonvolatile maintenance counter area 61 is stored in temporary maintenance counter storage area 62, the data in the first volatile maintenance counter area 71 will not be the most recent.

To handle this situation, the data in temporary maintenance counter storage area 62 is next overwritten to the first volatile maintenance counter area 71 by referencing the data validity information to select only those records where the values stored in fields A and B match, and write the counts for the corresponding maintenance counter numbers to first volatile maintenance counter area 71 (step S12).

This process assures that the data stored to first volatile maintenance counter area 71 is the most recent if temporary maintenance counter storage area 62 stores data that has not yet been written to nonvolatile maintenance counter area 61.

The data thus accumulated in the first volatile maintenance counter area 71 is then copied to second volatile maintenance counter area 72 (step S13). Two volatile maintenance counters each storing the same information are thus created in RAM 32.

Returning to FIG. 6, the CPU 31 then monitors if a predetermined time (2 minutes in this example) has passed (step S2). If the state of any of various printer units changes during this time, the CPU 31 overwrites and thus updates the count in the first volatile maintenance counter area 71 corresponding to the unit for which the state change was detected.

When the predetermined time has passed (step S2 returns Yes), the CPU 31 compares the content of first volatile maintenance counter area 71 with the content of second volatile maintenance counter area 72 to determine if any maintenance counter has been updated (step S3).

If an updated maintenance counter is found, the CPU 31 copies the updated count for the corresponding maintenance counter number from first volatile maintenance counter area 71 to temporary maintenance counter storage area 62 (step S4).

The CPU 31 then copies the first volatile maintenance counter area 71 to second volatile maintenance counter area 72 so that both maintenance counter areas contain the same data (step S5). By thus synchronizing the content of both maintenance counter areas, which maintenance counter has changed in first volatile maintenance counter area 71 can be readily determined by referencing the content of the updated second volatile maintenance counter area 72.

If an updated maintenance counter is not found in step S3, control loops back to step S2 and the CPU 31 waits the predetermined time again.

After step S5 the CPU 31 determines if the temporary maintenance counter storage area 62 is full (that is, whether all 21 records have been written using the table shown in FIG. 5) (step S6). If the temporary maintenance counter storage area 62 is not full, control returns to step S2 and the CPU 31 again waits the predetermined time.

If the temporary maintenance counter storage area 62 is full in step S6, the CPU 31 copies the data from the temporary maintenance counter storage area 62 into temporary data buffer area 73 and then from temporary data buffer area 73 into the nonvolatile maintenance counter area 61 (step S7). The main maintenance counter rendered by the nonvolatile maintenance counter area 61 is thus updated.

It will also be obvious as described above that the data can be copied from temporary maintenance counter storage area 62 directly to nonvolatile maintenance counter area 61 without using the temporary data buffer area 73 in RAM 32.

After the nonvolatile maintenance counter area 61 is updated, the CPU 31 reinitializes the temporary maintenance counter storage area 62 and thus clears all maintenance counter data so that new maintenance counter data can be again accumulated in the temporary maintenance counter storage area 62 (step S8). The temporary maintenance counter storage area 62 can also be effectively reinitialized by initializing only the data validity information values A and B without actually clearing the maintenance counter counts. Control then returns from step S8 to step S2 and the CPU 31 again waits the predetermined time.

What happens if printer 10 power fails between the main steps shown in FIG. 6 and FIG. 7 is described next.

If a power failure occurs before the predetermined time monitored in step S2 passes, data has not been written to the temporary maintenance counter storage area 62 in nonvolatile EEPROM 33, and the data updated in first volatile maintenance counter area 71 is thus lost. However, if the predetermined time monitored in step S2 is sufficiently short relative to how frequently the maintenance counters are updated (such as two minutes as in this embodiment of the invention), the amount of data lost during this time is minimal and poses essentially no problem with respect to the purpose of the maintenance counters, which is to measure the service life of certain components over a long period of use.

If a power failure occurs while writing to the temporary maintenance counter storage area 62 in step S4, and if the temporary maintenance counter storage area 62 is not correctly written, the following may occur.

(1) The maintenance count is written but the two maintenance counter numbers are not written and remain the initialized values.

(2) The maintenance count is written but the two maintenance counter numbers do not match.

(3) The maintenance count is not written, the two maintenance counter numbers are not written, and all values remain the initialized values.

Because the two maintenance counter numbers are not correctly written (the maintenance counter numbers are invalid), if writing to the temporary maintenance counter storage area 62 thus fails, the CPU 31 can always know if writing to the temporary maintenance counter storage area 62 failed.

Furthermore, if a power failure occurs while copying data from the temporary maintenance counter storage area 62 to nonvolatile maintenance counter area 61 in step S7, the data stored in nonvolatile maintenance counter area 61 may be rendered invalid. However, the temporary maintenance counter storage area 62 from which the data is copied has not been reinitialized at this time and is therefore valid. This invalid data will therefore be written from nonvolatile maintenance counter area 61 the next time printer 10 power turns on and the first volatile maintenance counter area 71 is created in RAM in step S11, but the first volatile maintenance counter area 71 is then updated in step S12 to the valid data stored in the temporary maintenance counter storage area 62. As a result, the first volatile maintenance counter area 71 stores the valid maintenance counter data after printer initialization is completed.

Furthermore, because normal values are written to nonvolatile maintenance counter area 61 after the temporary maintenance counter storage area 62 becomes full, any invalid data stored in the nonvolatile maintenance counter area 61 is overwritten by valid data. The nonvolatile maintenance counter area 61 can therefore be updated correctly in this situation without losing data.

Yet further, because the maintenance counters are referenced by reading the maintenance counter values from the first volatile maintenance counter area 71, invalid data in the nonvolatile maintenance counter area 61 does not present a problem.

Although the present invention has been described in connection with the preferred embodiments thereof with reference to the accompanying drawings, it is to be noted that various changes and modifications will be apparent to those skilled in the art. Such changes and modifications are to be understood as included within the scope of the present invention as defined by the appended claims, unless they depart therefrom.

What is claimed is:

1. A data processing device comprising:
a volatile memory for storing a maintenance counter value;
an EEPROM comprising a nonvolatile maintenance counter area and a temporary nonvolatile maintenance counter storage area; and
a CPU for updating the maintenance counter value in the volatile memory based on detection of a state change in the data processing device;
wherein:
the CPU writes the maintenance counter value from volatile memory to the temporary nonvolatile maintenance counter storage area at a first predetermined timing, and writes the maintenance counter value stored in the temporary nonvolatile maintenance counter storage area to the nonvolatile maintenance counter area at a second predetermined timing;
the volatile memory has a first volatile maintenance counter area for storing the maintenance counter value, and a second volatile maintenance counter area for storing the maintenance counter value;
the maintenance counter value stored to the second volatile maintenance counter area when data processing device power turns on is identical to the maintenance counter value stored in the first volatile maintenance counter area;
the maintenance counter value in the first volatile maintenance counter area is updated based on detection of a state change in the data processing device;
the CPU compares the content of the first volatile maintenance counter area and the content of the second volatile maintenance counter area at a third predetermined timing, and writes the updated maintenance counter value to the temporary maintenance counter storage area; and after the CPU compares the content of the first volatile maintenance counter area and the content of the second volatile maintenance counter area at the third predetermined timing, and writes the updated maintenance counter value to the temporary maintenance counter storage area, the CPU then copies the maintenance counter value from the first volatile maintenance counter area to the second volatile maintenance counter area.

2. A control method for a data processing device comprising volatile memory for storing a maintenance counter value, EEPROM comprising a nonvolatile maintenance counter area and a temporary nonvolatile maintenance counter storage area, and a CPU for updating the maintenance counter value in the volatile memory based on detection of a state change in the data processing device, the control method comprising steps of:

writing the maintenance counter value from volatile memory to the temporary nonvolatile maintenance counter storage area at a first predetermined timing; and writing the maintenance counter value stored in the temporary nonvolatile maintenance counter storage area to the nonvolatile maintenance counter area at a second predetermined timing;

wherein:

the volatile memory has a first volatile maintenance counter area for storing the maintenance counter value, and a second volatile maintenance counter area for storing the maintenance counter value;

the maintenance counter value stored to the second volatile maintenance counter area when data processing device power turns on is identical to the maintenance counter value stored in the first volatile maintenance counter area;

the maintenance counter value in the first volatile maintenance counter area is updated based on detection of a state change in the data processing device;

the content of the first volatile maintenance counter area and the content of the second volatile maintenance counter area are compared at a third predetermined timing, and the updated maintenance counter value is written to the temporary maintenance counter storage area; and the content of the first volatile maintenance counter area and the content of the second volatile maintenance counter area are compared, the updated maintenance counter value is written to the temporary maintenance counter storage area, and the maintenance counter value is then copied from the first volatile maintenance counter area to the second volatile maintenance counter area.

* * * * *